(12) United States Patent
Lu et al.

(10) Patent No.: US 11,770,350 B2
(45) Date of Patent: *Sep. 26, 2023

(54) ADAPTIVE NETWORKING POLICY WITH USER DEFINED FIELDS

(71) Applicant: Cisco Technology, Inc., San Jose, CA (US)

(72) Inventors: Mingzhe Lu, Fremont, CA (US); Hongqing Li, Sunnyvale, CA (US); Diana Leung, Los Altos, CA (US); Madhu Gindi, Sunnyvale, CA (US); Preety Mordani, Fremont, CA (US); Prabahar Radhakrishnan, Dublin, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,013

(22) Filed: Feb. 3, 2023

(65) Prior Publication Data

US 2023/0188479 A1 Jun. 15, 2023

Related U.S. Application Data

(63) Continuation of application No. 17/080,319, filed on Oct. 26, 2020, now Pat. No. 11,575,619.

(60) Provisional application No. 63/060,730, filed on Aug. 4, 2020.

(51) Int. Cl.
*H04L 49/00* (2022.01)

(52) U.S. Cl.
CPC .............................. *H04L 49/3009* (2013.01)

(58) Field of Classification Search
None
See application file for complete search history.

(56) References Cited

U.S. PATENT DOCUMENTS

| 7,738,403 | B2* | 6/2010 | Ottamalika | H04L 12/66 370/255 |
| 10,819,682 | B1* | 10/2020 | Deepak | H04L 63/0236 |

(Continued)

OTHER PUBLICATIONS

"Cisco-Class-Based-QoS, MIB," ActiveXperts Software, activexperts.com; Aug. 15, 2020.

(Continued)

*Primary Examiner* — Andre Tacdiran
(74) *Attorney, Agent, or Firm* — Baker Botts L.L.P.

(57) ABSTRACT

The present disclosure is directed to adaptive networking policy with user defined fields and includes one or more processors and one or more computer-readable non-transitory storage media coupled to the one or more processors and comprising instructions that, when executed by the one or more processors, cause one or more components to perform operations including generating a user defined attribute (UDA) value corresponding to a set of attributes; receiving, at a network device, a packet having one or more packet conditions; determining that the one or more packet conditions of the packet match the set of attributes of the UDA value; assigning a UDA tag to the packet, wherein the UDA tag corresponds to the UDA value and is configured for chaining with one or more other UDA tags; and taking an action on the packet based on the UDA tag.

20 Claims, 5 Drawing Sheets

(56) References Cited

U.S. PATENT DOCUMENTS

| | | | | |
|---|---|---|---|---|
| 2004/0143758 A1* | 7/2004 | Swander | ................. | H04L 63/20 |
| | | | | 713/154 |
| 2008/0279205 A1 | 11/2008 | Sgouros | | |
| 2017/0012940 A1 | 1/2017 | Chang | | |
| 2018/0367432 A1 | 12/2018 | Cociglio | | |
| 2018/0375686 A1 | 12/2018 | Rangaraman | | |
| 2023/0120684 A1* | 4/2023 | Gha | ..................... | H04L 1/1812 |
| | | | | 370/329 |

OTHER PUBLICATIONS

"QoS Policy and its Propagation Via BGP (QPPB)," Noction, noction.com Sep. 24, 2018.
Dr. Tim Moors, "Packet Classification," University of New South Wales Sydney, Apr. 9, 2017.

* cited by examiner

ADAPTIVE NETWORKING POLICY WITH USER DEFINED FIELDS

PRIORITY

This nonprovisional application is a continuation under 35 U.S.C. § 120 of U.S. patent application Ser. No. 17/080,319 filed on Oct. 26, 2020 and entitled "Adaptive Networking Policy with User Defined Fields," which claims priority to U.S. Provisional Patent Application No. 63/060,730 filed on Aug. 4, 2020, all of which is hereby incorporated by reference in its entirety.

TECHNICAL FIELD

The present disclosure generally relates to networking policy, and more specifically to adaptive networking policy with user defined fields.

BACKGROUND

Advanced network devices are growing increasingly important in the field of networking, and their competitive edge rests on providing superior performance. One of the crucial components impacting performance is implementing network policy, which is often challenged by lookup speed, configuration capacity, as well as stability.

DESCRIPTION OF EXAMPLE EMBODIMENTS

Overview

Figure 1:
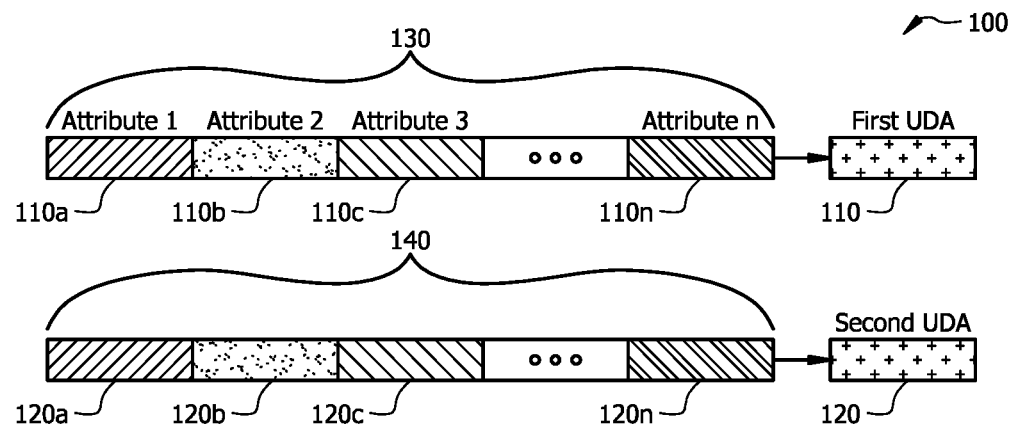
FIG. 1 illustrates an example (User Defined Attribute) UDA mapping, in accordance with certain embodiments.

According to an embodiment, a system may include one or more processors and one or more computer-readable non-transitory storage media comprising instructions that, when executed by the one or more processors, cause one or more components of the system to perform operations including, generating a user defined attribute (UDA) value corresponding to a set of attributes; receiving, at a network device, a packet having one or more packet conditions; determining that the one or more packet conditions of the packet match the set of attributes of the UDA value; assigning a UDA tag to the packet, wherein the UDA tag corresponds to the UDA value and is configured for chaining with one or more other UDA tags; and taking an action on the packet based on the UDA tag.

Moreover, the UDA tag may remain with the packet as the packet travels within the network device. The UDA tag may also remain with the packet as the packet travels through a network Additionally, the operations may include assigning to the packet a plurality of UDA tags corresponding to a plurality of UDA values.

Moreover, the operations may include creating a policy filter associated with the UDA value for application of a policy, the policy filter having requirements that match the set of attributes of the UDA value. The operations may further include applying the policy to the packet when the UDA value associated with the policy filter matches the UDA tag of the packet. The operations may also include chaining the UDA value of the policy filter with at least one of the following: one or more other UDA values, or one or more other attributes.

Furthermore, the UDA value may compress at least one matching field of the policy filter, thereby reducing a lookup speed when the policy is applied against the packet.

According to another embodiment, a method may include the steps of generating a user defined attribute (UDA) value corresponding to a set of attributes; receiving, at a network device, a packet having one or more packet conditions; determining that the one or more packet conditions of the packet match the set of attributes of the UDA value; assigning a UDA tag to the packet, wherein the UDA tag corresponds to the UDA value and is configured for chaining with one or more other UDA tags; and taking an action on the packet based on the UDA tag.

According to yet another embodiment, one or more computer-readable non-transitory storage media may embody instructions that, when executed by a processor, cause the performance of operations, including generating a user defined attribute (UDA) value corresponding to a set of attributes; receiving, at a network device, a packet having one or more packet conditions; determining that the one or more packet conditions of the packet match the set of attributes of the UDA value; assigning a UDA tag to the packet, wherein the UDA tag corresponds to the UDA value and is configured for chaining with one or more other UDA tags; and taking an action on the packet based on the UDA tag.

Technical advantages of certain embodiments of this disclosure may include one or more of the following. The systems and methods described herein may allow for the generation of UDAs, defined attributes which may be assigned to packets for use as a matching attribute for packet classification lookups. UDAs may enable match entry compression by mapping multiple matching attributes to the same UDA value, thereby preserving lookup resources, increasing lookup speed, and reducing overall footprint. Moreover, UDAs may be available to any feature inside or outside a network device in both ingress and egress fields.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Current advanced network devices must support multiple features, such as Access Control Lists (ACLs), Quality of Service (QoS) parameters, and firewalls, all of which have differentiated traffic treatments with different operations. These operations are defined in feature policies using packet classification as the central module methodology. Conventionally, packets are classified based on attributes which are directly provided within the packets. When a packet enters a network device, a policy system compares the attributes required by a given policy (as defined by the policy filters) with the attributes in the packet. If there is a match, the system may take an action on the packet, as defined by the policy. Packets having different attributes may be treated differently based on the policy. The packet attributes are repeatedly referenced when multiple policies are applied to a single packet, resulting in at least the following two limitations.

First, the complicated attribute combinations slow down the packet classification lookup speed, which has a direct impact on the device's throughput. Second, the frequent referencing of attributes (e.g., when applying multiple policies to a single packet) requires a high capacity of device resources. Since the same packet attribute appears multiple times in the various classification policy-maps, the device needs to provide space to store them. Ternary content addressable memory (TCAM) is the most widely used packet classification lookup device in high-end network equipment. Despite its prevalence, the device is not only expensive but imposes limitations that downgrade functionality. First, the size of TCAM is limited; as a result, the maximum number of entries which can be accommodated inside TCAM is also limited. For example, the maximum number of TCAM entries in high end devices (such as Cisco® ASR 1000 series routers) is on the order of 128,000, becoming a bottleneck to features that require packet classification support. Additionally, TCAM entry width is also a limitation to feature configuration. Since the parallel comparison operation is performed in a TCAM operation, it requires a presentation of the complete matching fields in TCAM entries simultaneously, which may require a large entry width. The TCAM in high end devices, such as the ASR 1000 series routers, only supports two widths, 160 bits and 320 bits, and the 320 bit width is insufficient to accommodate sophisticated features such as Object Groups for access control lists (OGACL), QoS, and zone-based firewalls (ZBFW).

The present disclosure purposes to address these and other problems by introducing a User Defined Attribute (UDA) for achieving adaptive networking policy. The UDA is a mapping scheme that may be pre-defined by users or may be auto-generated based on policy configurations, and comprises a set of attributes or conditions for matching with a packet. The attributes that comprise a UDA may be associated with conditions within a packet, external to a packet, or a combination of both. The UDA may be used to create policies, match packets, perform further classifications, and the like.

Reference is now made to FIG. 1, wherein is illustrated a pictorial representation of an example UDA mapping system 100, in accordance with the present disclosure. As shown in FIG. 1, a plurality of attributes 110a-d or conditions to be matched are defined and assigned a UDA value 110. In other words, the UDA value 110 may map to the plurality of attributes 110a-d. The plurality of attributes may include, e.g., Attribute 1 110a, Attribute 2 110b, Attribute 3 110c, and Attribute n 110n (collectively, a first set of attributes 130). Any number of additional attributes may be included in the first set of attributes 130, as indicated by the ellipses between Attribute 3 110c and Attribute n 110n. While FIG. 1 depicts the first set of attributes of 130 as comprising a plurality of attributes, the first set of attributes may also comprise one or more attributes. Attributes may comprise, by way of example and not limitation, source and destination IP addresses, port numbers, traffic types, packet alliances, input interface, virtual private network (VPN) information, and/or any other characteristics associated with packets. Any number of UDA values may be defined and may map to any set of attributes. For example, as shown in FIG. 1, a second plurality of attributes 120a-n (collectively, a second set of attributes 140) to be matched, and which may include same and/or different attributes from the first set of attributes 130, may be defined and assigned to a second UDA value 120. The second UDA value 120 may map to the second set of attributes 140. In an embodiment, a UDA value may comprise existing attributes, i.e., conventional attributes that may be within or external to a packet and that may be used as packet classification matching fields. In another embodiment, a UDA value may correspond to one or more other UDAs. In yet another embodiment, a UDA value may correspond to one or more existing UDAs combined with other attributes. Once defined, the UDA values 110, 120 may be used to classify packets, create policies, etc., as described further below.

In an embodiment, users may define the mappings between the UDA values 110, 120 and their corresponding sets of attributes 130, 140. The mappings may be defined locally via a user interface of the network device (such as network device 230 shown in FIG. 2), or may be performed remotely via configuration messages. In another embodiment, UDA values 110, 120 may be automatically defined (e.g., by a controller) based on policy configurations for various optimizations of policy enforcement. As an example, an automatic UDA generation module (not shown) may create and assign the UDA values by abstracting the common matching combinations across policies. The UDAs may be used to reduce the policy sizes and policy footprint, and accelerate the lookup speed, as further described below.

Figure 2:
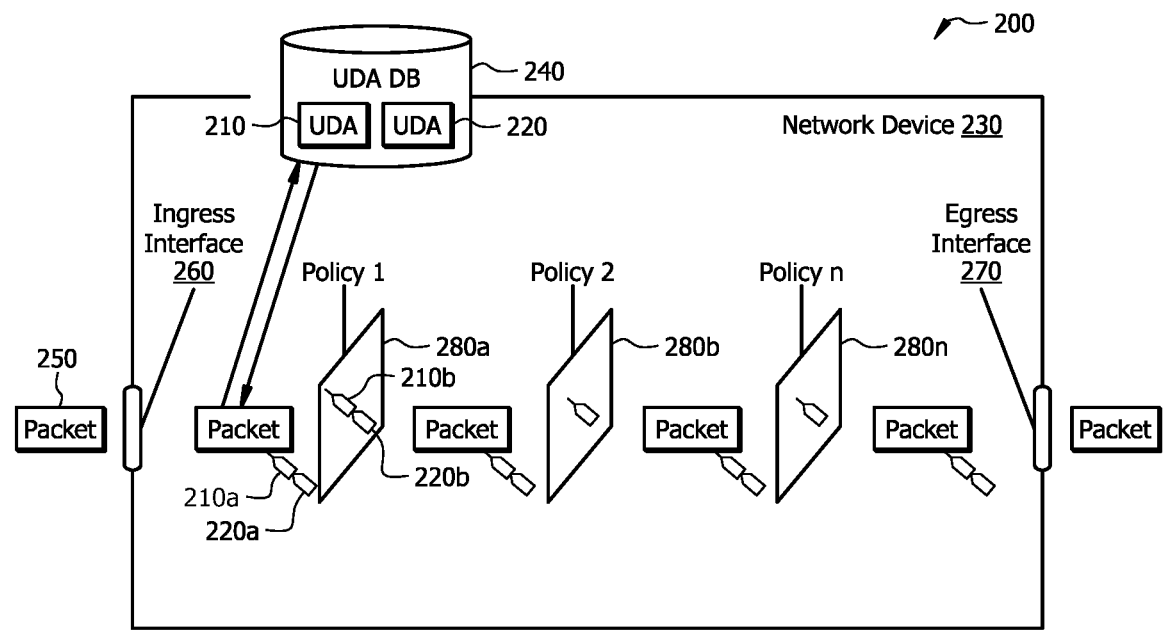
FIG. 2 illustrates a system based on the use of UDAs in a local network device, in accordance with certain embodiments.

Reference is now made to FIG. 2, wherein is illustrated a system 200 depicting the use of UDAs in a local network device (also referred to as "local UDAs"). System 200 may include a network device 230 having an ingress interface 260 and an egress interface 270. The network device 230 may comprise, e.g., a switch, a router, a security device, or any other type of network device known in the art. System 200 may further include a UDA database 240. The UDA database 240 may comprise a storage device and may exist inside or outside of the network device 230. The UDA database 240 may be used to store the UDA values 210, 220 (corresponding to 110, 120 of FIG. 1) which include the defined mappings between the UDA values 210, 220 and their respective sets of attributes (130, 140 of FIG. 1).

The system 200 may further include one or more policies (Policy 1 280a, Policy 2 280b, and Policy n 280n are shown), which may be enforced inside the network device 230. The UDA values 210, 220 may be used by the one or more policies 280a, 280b, 280n to create filters in the same way as conventional packet attributes. Specifically, as shown in FIG. 2, UDA values 210, 220, may be used alone or in combination with other attributes to construct the policy filters 210b, 220b for Policy 1 280a (wherein policy filter 210b corresponds to UDA value 210, and policy filter 220b corresponds to UDA value 220). The policy filters 210b, 220b may be defined by the set of attributes which correspond to UDA values 210, 220. In an embodiment, multiple UDA values may be chained to create a chained policy filter for any given policy. By way of example, FIG. 1 shows Policy 1 280a having chained policy filters 210b, 220b corresponding to UDA values 210, 220. The one or more policies 280a, 280b, 280n may be configured such that policy actions require a match with the attributes defined by UDA values. For example, for Policy 1 280*a*, its policy action may require a match with the sets of attributes defined by policy filters 210*b*, 220*b* and which correspond to UDA values 210, 220. In another embodiment, a UDA value may be chained with one or more other attributes to create a policy filter. In yet another embodiment, a UDA value may be chained with one or more other UDA values and one or more other attributes to create a chained policy filter.

The operation of system 200 may generally be described as follows. One or more UDA values 210, 220 may be defined based on a set of attributes to be matched and saved in the UDA database 240, as described above. UDA values 210, 220 are shown in UDA database 240, but it is to be understood that any number of UDA values may be defined and stored in the UDA database 240. When a packet 250 enters a network device 230, it may be analyzed to determine whether one or more packet conditions of the packet match a set of attributes of at least one defined UDA value stored in UDA database 240. If the system determines a match between the packet conditions of the packet 250 and a defined UDA value (e.g., 210 and/or 220), a UDA tag may be assigned to the packet 250, wherein the UDA tag is associated with the matched UDA value. A plurality of UDA tags may be applied to the single packet, the plurality of UDA tags based on a plurality of UDA values. By way of example, as shown in FIG. 1, packet 250 may have packet conditions that match the set of attributes of UDA values 210, 220, and therefore may be tagged with two UDA tags 210*a*, 220*a*, which correspond to UDA values 210, 220. In an embodiment, the UDA tags 210*a*, 220*a* may stay with the packet 250 as it travels through the network device 230, and may be used as a matching attribute for packet classification lookups.

In an embodiment packets may be tagged based on the rule of class maps. According to this embodiment, a class map may be defined (e.g., class-map tag-10), wherein a set of attributes or conditions associated with packets are defined using a match statement. When an incoming packet meets any of these attributes, it may be assigned to this class map. Any number of class maps may be defined, and each class map may have different conditions. As a result, a packet may belong to a plurality of class maps. Next a policy map may be formed. When a packet comes in, the packet may be compared with the policy map and it may be determined which class map the packet belongs to. If the packet belongs to any of the defined class maps, a tag value may be assigned to the packet. This tag value, having a smaller footprint than the individual attributes of the packet, may then travel with the packet.

As the packet 250 travels within the network device, the system 200 may determine one or more policies that may be applied to the packet 250. When a given policy, such as Policy 1 280*a*, requires UDA values for enforcement against the packet 250 (based on its UDA-based policy filters 210*b*, 220*b*), it will determine whether there are any UDA values associated with the packet 250. In one embodiment, the policy may determine whether any UDA values are associated with the packet by analyzing whether any UDA tags have been applied to the packet 250 (as described above). In another embodiment, the policy may query the UDA database 240 to obtain the UDA values associated with the packet. If the UDA tags 210*a*, 220*a* and or UDA values 210, 220 associated with the packet 250 match the UDA values of the policy filters 210*b*, 220*b*, then Policy 1 280*a* will apply the appropriate policy action to the packet 250. If there is no match, the system may check for matches with respect to one or more other policy filters of other policies, such as Policy 2 280*b* and/or Policy n 280*n*, and if one or more matches are found, corresponding policy actions may be taken accordingly.

In addition to its use in constructing filters, a UDA value may also be used to direct traffic, i.e., the flow of the packet. For example, a single UDA may be used to reroute the traffic, remap the traffic, drop the packet, etc.

Figure 3:
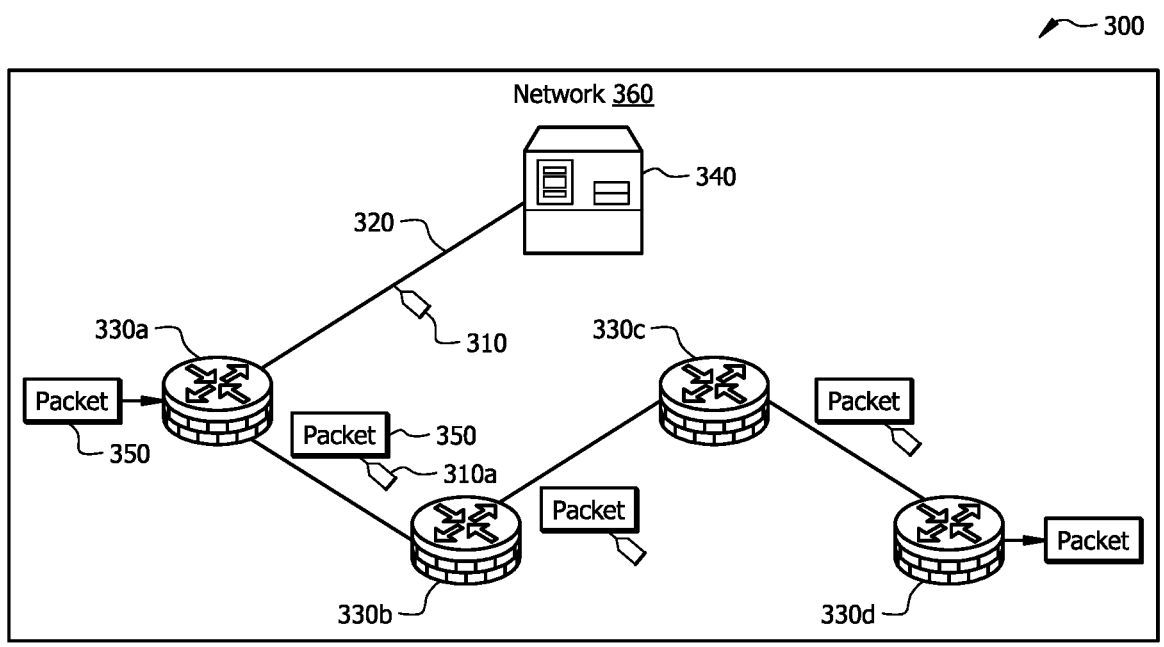
FIG. 3 illustrates a system based on the use of UDAs in a network configuration, in accordance with certain embodiments.

Reference is now made to FIG. 3, wherein is illustrated a system 300 depicting the use of UDAs in a network configuration (also referred to as "network-based UDAs"). System 300 may include a network controller 340 and one or more network devices 330*a*, 330*b*, 330*c*, 330*d*. According to system 300, the mappings between UDA values and packet attributes/conditions may be defined in network controller 340. In an embodiment, the UDA values in the network configuration may be manually defined by a user. In another embodiment, the UDA values in the network configuration may be generated automatically by the network controller 340 using a self-generation module (not shown). The self-generation module may use various configurations, correlations, and other data conditions to assign and correlate UDA values, as needed. In particular, the network controller may generate and assign UDA values based on the overall network policy configurations, as well as information from the network telemetry system. The network controller 340 may also generate UDA values for specific purposes. For example, the network controller 340 may obtain the traffic flow visibility by assigning the UDA values to certain packet flows. These flow-based UDAs may be used to serve telemetry purposes, forming a feedback loop with the UDA generation module for the better UDA generation.

Once the UDA values are defined, they may be downloaded from the network controller 340 to one or more network devices 330*a*, 330*b*, 330*c*, 330*d*. (FIG. 3 shows UDA value 310 downloaded to network device 330*a*.) Once downloaded, the UDA values may be stored in a storage device associated with the network device 330*a* (such as UDA database 240 shown in FIG. 2). As described above, when a policy system in the network device 330*a* requires the UDA values for enforcement against the packet, it may query the UDA database to determine whether any UDA tags may be assigned to a given packet based on defined UDA values. If a match is found, the corresponding UDA tags may be attached to the packet 350 for further reference. (For purposes of illustration, FIG. 3 shows a UDA tag 310*a* corresponding to UDA value 310 attached to packet 350.) In an embodiment, the UDA tags may be carried by the packets from one network device (e.g., 330*a*) to another network device (e.g., 330*b*) within the defined network 360. The UDA tags and/or UDA values may be referenced by the policies inside the network 360, and may remain with the packets across the network devices 330*a*, 330*b*, 330*c*, 330*d*. In an embodiment, the network-based UDAs may be used together with the local UDAs in the same policy, as well as in different policies.

Figure 4A:
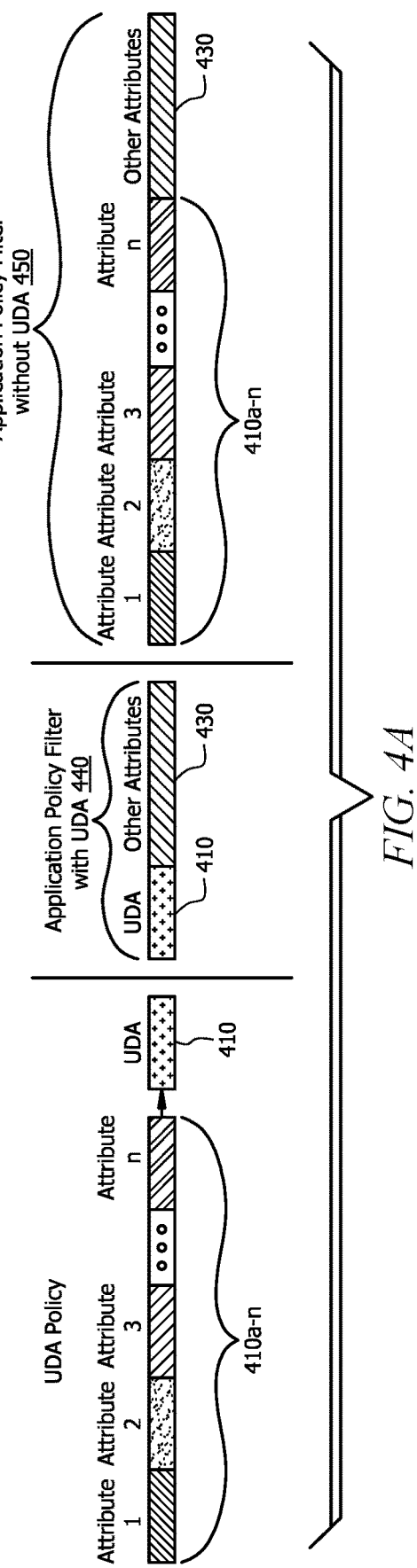
FIG. 4A illustrates example improvements resulting from the use of UDAs, in accordance with certain embodiments.
Figure 4B:
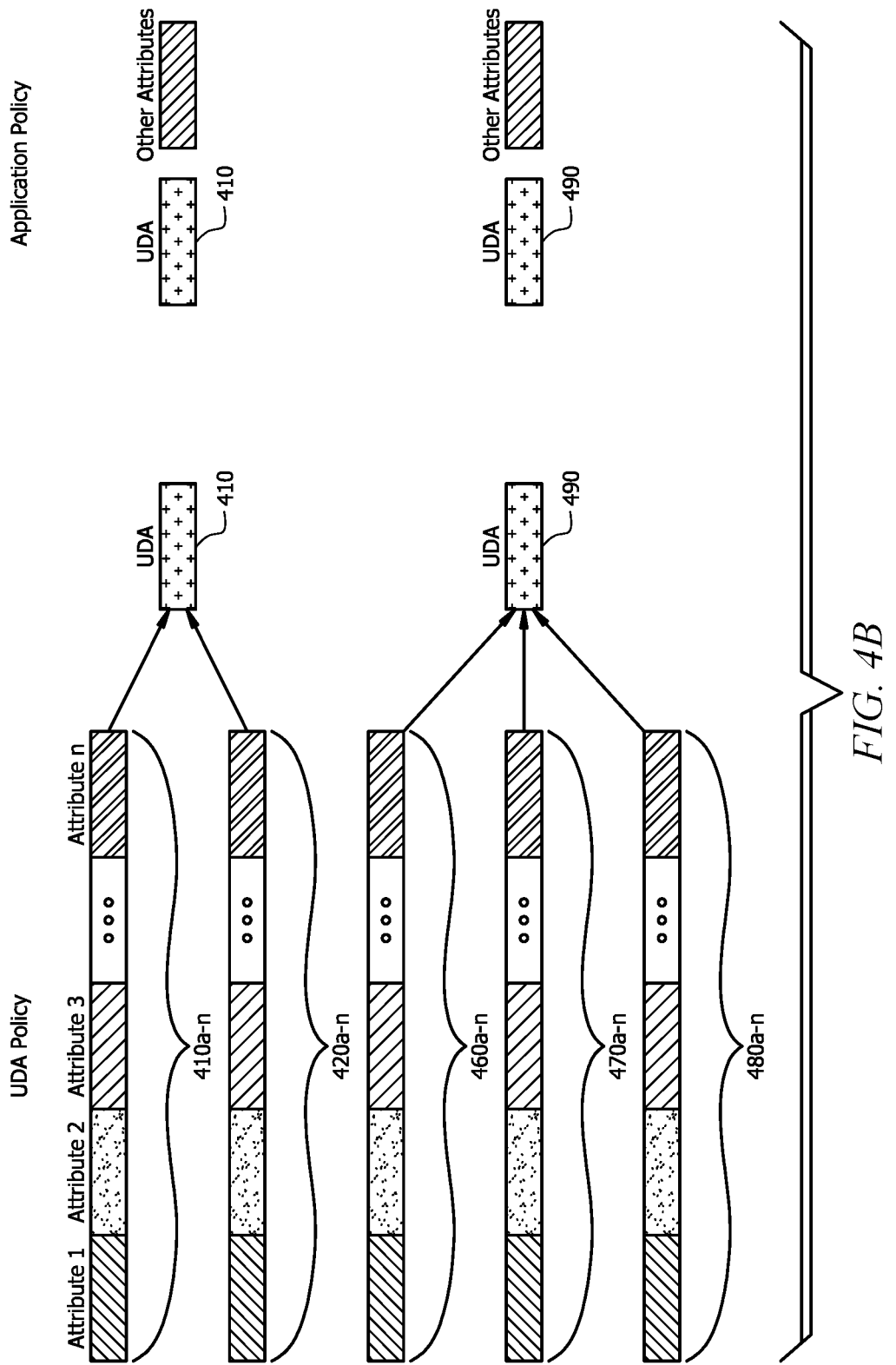
FIG. 4B illustrates further example improvements resulting from the use of UDAs, in accordance with certain embodiments.

Reference is now made to FIGS. 4A and 4B, wherein are shown example improvements that result from the use of UDAs. First, as illustrated in FIG. 4A, UDAs may enable match entry compression (i.e., by compressing one or more matching fields used by policy filters against traffic flows) which result in improved lookup speeds. As described above, UDA values may be defined based on a mapping of a set of packet attributes, e.g., a set of attributes 410*a*-*n* may map to one UDA value 410. An application policy filter 440, which may be built with the UDA value 410, may use the defined UDA value 410 with any other attributes 430 to the form the application policy filter 440. By way of comparison, an application policy filter 450 formed without using the UDA value 410 is built using each individual attribute 410*a-n* required for the policy filter 450. As shown in FIG. 4A, the width of the attribute set 410*a-n* is much wider than the width of the mapped UDA 410. The smaller width of the UDA 410 and its use in constructing the application policy filter 440 introduces advantages to the policy module in terms of policy lookup speed. Specifically, UDA value 410 compresses at least one matching field of the policy filter, thereby significantly reducing the lookup speed when the policy is applied against the packet because the policy entry width to be matched decreases. For example, by consolidating multiple attributes from packets under one UDA value, the TCAM width requirement may be alleviated. The smaller TCAM width results in a faster lookup speed. Additionally, UDAs may also preserve packet classification lookup resources by associating the UDA value with a packet when it passes through the network device, avoiding the replication of shared class-maps in different policies. Furthermore, reusing the packet UDA lookup result, in contrast to composing the lookup key based on packet attributes, may also speed up the lookup process and save time.

Next, as illustrated in FIG. 4B, UDAs may enable improved scalability. With UDA, the number of entries in an application policy filter may be reduced dramatically. For example, as shown in FIG. 4B, the UDA policy may map multiple filters to the same UDA value, if those filters have the same policy operation. For example, a first filter having attributes 410*a-n* and a second filter having attributes 420*a-n* may map to the UDA value 410. Similarly, a third filter having attributes 460*a-n*, a fourth filter having attributes 470*a-n*, and a fifth filter having attributes 480*a-n*, each of these filters having any number of attributes, may map to the UDA value 490.

To illustrate further, an access network device, which manages a large number of clients, may be designed to apply access control list (ACL), zone-based firewall (ZBFW), and Quality of Service (QoS) policies to a set of clients. The client traffic may be identified by their IP addresses and protocols. The identification information may be repeatedly included in all of those policies, even though multiple client traffics have the same policy operations. With the UDA, those clients having the same policy operations may be mapped to the same UDA value. Those application policies may be built on top of the UDA values, instead of individually identifying the information. Since the number of UDA values will be less than the number of filters (i.e., the number of attributes forming the filters), the number of entries in the application policy will be reduced. Additionally, the number of resources used on the system is also significantly reduced in terms of TCAM, CPU cycles, storage, and the like.

Additional improvements that result from the use of UDAs include the application of UDAs to multiple policies to improve system stability processing the policy updates. Conventionally, policy updates require an update to filter matching conditions. For example, for a filter comprising {src_IP=1.1.1.1, dst_IP=2.2.2.2 and DSCP=0}, an update may include the new IP addresses. If this filter is used in many policies, then each policy is required to be updated. With UDAs, the policy may add reference variables in policy configurations. Therefore, policy updates may only change the UDA definitions instead of the UDA values themselves. Therefore a policy update may be made by a single, centralized update, thereby ensuring application policies remain intact and reducing system disturbance.

The present disclosure further provides a mechanism to achieve adaptive network policy. The adaptive network expands on autonomous networking concepts to transform the static network into a dynamic, programmable environment driven by analytics and intelligence. The policy is so named for its adaptive capability at the network device level, resulting in fast response times as well as network configuration stability. In an embodiment, when UDAs are used in the network policies for traffic engineering, network policies may be controlled by updating the UDA values. The UDA value updates may be driven by network traffic and connectivity patterns of network workloads.

In another embodiment, the programmability of the network device policy via UDAs may be network-wide as well. With network-based UDAs, the network configuration changes may convey from device to device, which further direct the network policies in each individual network device to take the external instructions, as well as handle environmental changes. This control process may be fully automated by using a time-based mechanism, as well as machine learning methods. The UDA values may be pre-defined based on time, so that the network configuration may be adaptive to better serve the traffic. For example, a large amount of traffic may flow to email servers during early morning periods of each weekday. In contrast, there may be a lot of movie-streaming traffic during the evenings on weekends. The network device may be easily switched to the corresponding network policy via a UDA value setting.

Figure 5:
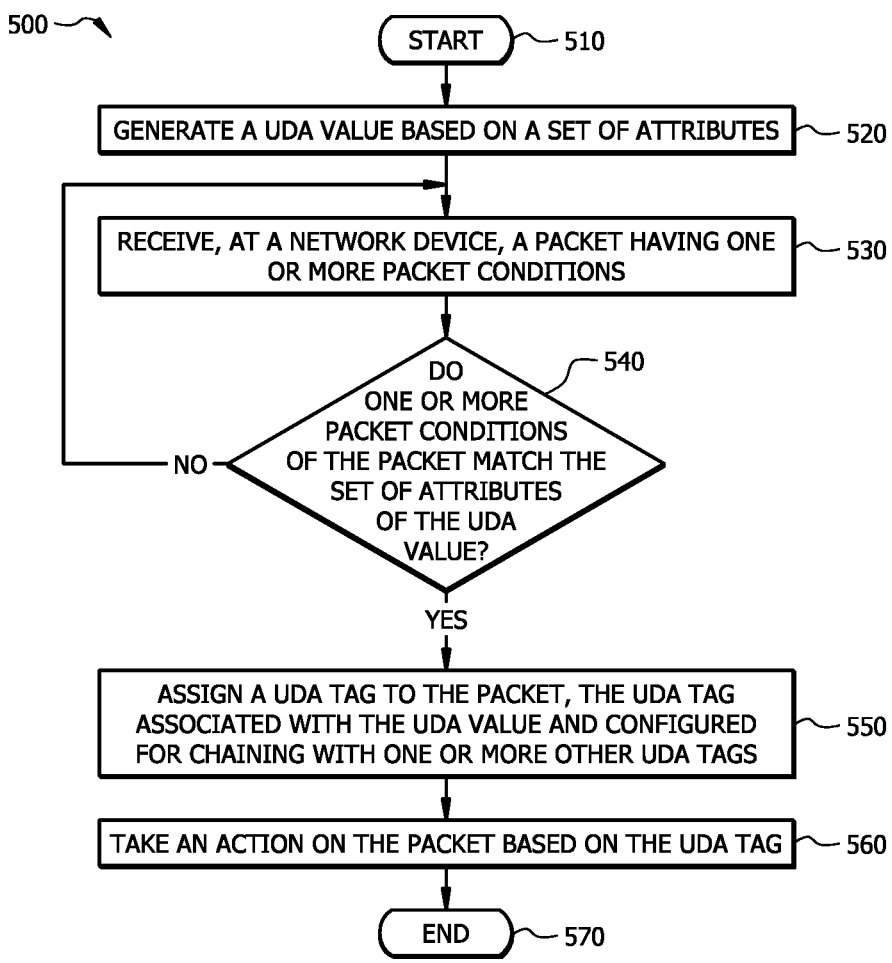
FIG. 5 illustrates a flow diagram of a method for using UDAs, in accordance with certain embodiments.

Reference is now made to FIG. 5, wherein is shown a flow diagram of a method 500 according the present disclosure. The steps of method 500 may be in accord with the operations outlined in conjunction with mapping and systems 100, 200, and 300 of FIGS. 1-3. As such, similar and corresponding terms described in conjunction with FIGS. 1-3 may have the same meaning when used in conjunction with method 500 of FIG. 5. Additionally, the present disclosure incorporates by reference the description of the UDA mapping and systems 100, 200, and 300 above, for the purposes of explaining, expounding upon, or otherwise clarifying any of the steps of method 500. In an embodiment, the steps of method 500 may be performed by a network device. However, it is to be understood that the present disclosure is not to be so limited, and that in other embodiments, the steps of method 500 may be performed by any component, element, or device, as understood by one of ordinary skill in the art.

The method may begin at step 510. At step 520, a UDA value may be generated based on a set of attributes. Specifically, a UDA value may be mapped or matched to a set of attributes comprising one or more attributes. The set of attributes may include any number of attributes. Attributes may comprise, by way of example and not limitation, source and destination IP addresses, port numbers, traffic types, packet alliances, input interface, virtual private network (VPN) information, and/or any other characteristics associated with packets. Moreover, any number of UDA values (mapping to any number of sets of attribute) may be generated. In an embodiment, a UDA value may comprise existing attributes that may be within or external to a packet and that may be used as packet classification matching fields. In another embodiment, a UDA value may correspond to one or more other UDAs. In yet another embodiment, a UDA value may correspond to one or more existing UDAs combined with other attributes. Additionally, the UDA value may be generated and saved in a storage device or database on a network device, and then used within the local network device. The network device may comprise, e.g., a switch, a router, a security device, or any other type of network device known in the art. In another embodiment, the UDA value may be generated and used in a network, and downloaded to one or more network devices, where it may be stored in a storage device or database. With respect to the network-based UDAs, the UDA values may be associated with packets and may be carried from one network device to another network device within the defined network. The UDA values may be referenced by the policies inside the network, and may remain with the packets across the network devices. In an embodiment, the network-based UDAs may be used together with the local UDAs in the same policy, as well as in different policies.

In an embodiment, the step of "generating" a UDA value may be performed by a network device based on values defined by a user, i.e., wherein the user may define the mappings between the UDA values and their corresponding sets of attributes. The mappings may be defined locally via a user interface of the network device, or may be performed remotely via configuration messages. Once the user has defined the UDA value, the system may then generate, i.e., by making available, the UDA value in the network device. In another embodiment, the system itself may define and then generate a UDA value. In this embodiment, a system component (e.g., a controller, a module, etc.) may automatically define a UDA value based on policy configurations for various optimizations of policy enforcement. As an example, an automatic UDA generation module may create and assign the UDA values by abstracting the common matching combinations across policies.

At step 530, a packet having one or more packet conditions may be received at a network device. At step 540, a determination is made as to whether the one or more packet conditions of the packet match the set of attributes of the UDA value. Specifically, the packet may be evaluated to determine whether its packet conditions match the set of attributes of the defined UDA value. If, at step 540, it is determined that the one or more packet conditions of the packet match the set of attributes of the UDA value, the method may proceed to step 550. If, however, it is determined that the one or more packet conditions of the packet do not match the set of attributes of the UDA value, the method may return to step 530, wherein a new packet having one or more packets are received at the network device. In another embodiment, if it is determined that the one or more conditions of the packet do not match the set of attributes of the UDA value, the system may determine whether there is a match with any other defined UDA values.

At step 550, if a match is determined between the packet conditions of the packet and the UDA value, a UDA tag is assigned to the packet, the UDA tag associated with the UDA value. In an embodiment, the UDA tag may be configured for chaining with one or more other UDA tags, wherein the one or more other UDA tags are associated with one or more other UDA values. In other words, a plurality of UDA tags corresponding to a plurality of UDA values may be assigned to a single packet. In an embodiment, the UDA tag(s) may remain with the packet as it travels within the network device and/or through the network, and may be used as a matching attribute for packet classification lookups.

At step 560, an action may be taken on the packet based on the UDA tag. These actions may include, by way of example and not limitation, applying a policy on the packet, further classifying the packet, and any other actions that may be contemplated in the art.

With respect to the action of applying a policy, the use of UDAs to by policies to create policy filters will now be described. Specifically, a UDA value (defined by a set of attributes) may be used to create a policy filter for one or more policies in the control plane. Therefore, instead of using a plurality of individual attributes to construct a filter, a UDA value corresponding to a set of attributes may be used as the filter. In other words, the policy filter associated with a UDA value will have requirements that match the set of attributes of the UDA value. In an embodiment, a single UDA value may be used to create a policy filter. In another embodiment, a UDA value may be chained with one or more other attributes to create a policy filter. In another embodiment, a UDA value may be chained with one or more other UDA values to create a chained policy filter for any given policy. In yet another embodiment, a UDA value may be chained with one or more other UDA values and one or more other attributes to create a chained policy filter.

As a packet travels within the network device, a determination may be made as to whether one or more policies that may be applied to the packet. When a given policy requires UDA values for enforcement against the packet (i.e., its policy filters are based on UDA values), it may determine whether there are any UDA values associated with the packet. In one embodiment, the policy may determine whether any UDA values are associated with the packet by analyzing whether any UDA tags have been applied to the packet (as described above). In another embodiment, the policy may query the UDA database to obtain the UDA values associated with the packet. If the UDA value associated with the policy filter matches the UDA tag of the packet, then the policy may be applied to the packet, and the appropriate policy action may be taken on the packet. If there is no match, the system may check for matches with respect to one or more other policy filters of other policies, and if one or more matches are found, corresponding policy actions may be taken accordingly.

At step 570, the method may end.

In sum, the systems and methods of the present disclosure propose a User Defined Attribute (UDA) mechanism to enhance the classification process and improve speed, flexibility, efficiency, and scalability of network devices. The UDA may be used in a variety of applications, including network policy compression, policy lookup acceleration, enhancement of SDWAN configuration, and facilitation of adaptive network policy implementation.

Figure 6:
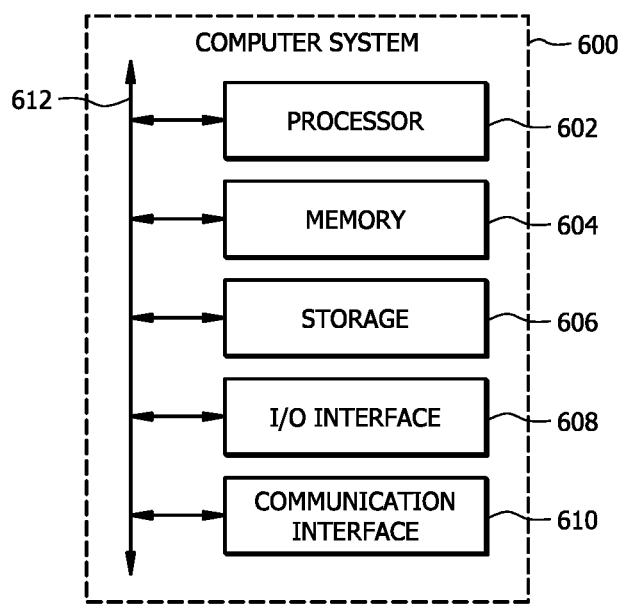
FIG. 6 illustrates a computer system, in accordance with certain embodiments.

Reference is now made to FIG. 6, wherein is shown an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and one or more computer-readable non-transitory storage media comprising instructions that, when executed by the one or more processors, cause one or more components of the system to perform operations comprising:
generating a user defined attribute (UDA) value that is mapped to a set of two or more attributes;
receiving, at a network device, a packet having one or more packet conditions;
determining that the one or more packet conditions match the set of two or more attributes of the UDA value;
assigning a UDA tag to the packet, wherein the UDA tag corresponds to the UDA value and wherein the assigning comprises amending the packet with the UDA tag;
chaining the UDA tag in the packet with one or more other attributes and one or more other UDA tags; and
taking an action on the packet based on the UDA tag.

2. The system of claim 1,
wherein the UDA tag remains with the packet as the packet travels within the network device.

3. The system of claim 1,
wherein the UDA tag remains with the packet as the packet travels through a network.

4. The system of claim 1, the operations further comprising:
assigning to the packet a plurality of UDA tags corresponding to a plurality of UDA values.

5. The system of claim 1, the operations further comprising:
creating a policy filter associated with the UDA value for application of a policy,
the policy filter having requirements that match the set of attributes of the UDA value; and
chaining the UDA value of the policy filter with one or more other UDA values.

6. The system of claim 1, the operations further comprising:
creating a policy filter associated with the UDA value for application of a policy,
the policy filter having requirements that match the set of two or more attributes of the UDA value; and
applying the policy to the packet when the UDA value associated with the policy filter matches the UDA tag of the packet.

7. The system of claim 6,
wherein the UDA value is a compressed representation of at least one matching field of the policy filter, thereby reducing a lookup speed when the policy is applied against the packet.

8. A method, comprising:
generating a user defined attribute (UDA) value that is mapped to a set of two or more attributes;
receiving, at a network device, a packet having one or more packet conditions;
determining that the one or more packet conditions match the set of two or more attributes of the UDA value;
assigning a UDA tag to the packet, wherein the UDA tag corresponds to the UDA value and wherein the assigning comprises amending the packet with the UDA tag;
chaining the UDA tag in the packet with one or more other attributes and one or more other UDA tags; and
taking an action on the packet based on the UDA tag.

9. The method of claim 8,
wherein the UDA tag remains with the packet as the packet travels within the network device.

10. The method of claim 8,
wherein the UDA tag remains with the packet as the packet travels through a network.

11. The method of claim 8, further comprising:
assigning to the packet a plurality of UDA tags corresponding to a plurality of UDA values.

12. The method of claim 8, further comprising:
creating a policy filter associated with the UDA value for application of a policy,
the policy filter having requirements that match the set of attributes of the UDA value; and
chaining the UDA value of the policy filter with one or more other UDA values.

13. The method of claim 8, further comprising:
creating a policy filter associated with the UDA value for application of a policy,
the policy filter having requirements that match the set of two or more attributes of the UDA value; and
applying the policy to the packet when the UDA value associated with the policy filter matches the UDA tag of the packet.

14. The method of claim 13,
wherein the UDA value is a compressed representation of at least one matching field of the policy filter, thereby reducing a lookup speed when the policy is applied against the packet.

15. One or more computer-readable non-transitory storage media embodying instructions that, when executed by a processor, cause performance of operations comprising:
generating a user defined attribute (UDA) value that is mapped to a set of two or more attributes;
receiving, at a network device, a packet having one or more packet conditions;
determining that the one or more packet conditions match the set of two or more attributes of the UDA value;
assigning a UDA tag to the packet, wherein the UDA tag corresponds to the UDA value and wherein the assigning comprises amending the packet with the UDA tag;
chaining the UDA tag in the packet with one or more other attributes and one or more other UDA tags; and
taking an action on the packet based on the UDA tag.

16. The one or more computer-readable non-transitory storage media of claim 15,
wherein the UDA tag remains with the packet as the packet travels within the network device.

17. The one or more computer-readable non-transitory storage media of claim 15,
wherein the UDA tag remains with the packet as the packet travels through a network.

18. The one or more computer-readable non-transitory storage media of claim 15, the operations further comprising:
creating a policy filter associated with the UDA value for application of a policy,
the policy filter having requirements that match the set of attributes of the UDA value; and chaining the UDA value of the policy filter with one or more other UDA values.

19. The one or more computer-readable non-transitory storage media of claim 15, the operations further comprising:
creating a policy filter associated with the UDA value for application of a policy,
the policy filter having requirements that match the set of two or more attributes of the UDA value; and
applying the policy to the packet when the UDA value associated with the policy filter matches the UDA tag of the packet.

20. The one or more computer-readable non-transitory storage media of claim 19,
wherein the UDA value is a compressed representation of at least one matching field of the policy filter, thereby reducing a lookup speed when the policy is applied against the packet.

* * * * *